(12) United States Patent
Gendron-Hansen et al.

(10) Patent No.: US 12,074,198 B2
(45) Date of Patent: Aug. 27, 2024

(54) SEMICONDUCTOR DEVICE WITH IMPROVED TEMPERATURE UNIFORMITY

(71) Applicant: Analog Power Conversion LLC, Bend, OR (US)

(72) Inventors: Amaury Gendron-Hansen, Bend, OR (US); Dumitru Gheorge Sdrulla, Bend, OR (US); Leslie Louis Szepesi, Bend, OR (US)

(73) Assignee: Analog Power Conversion LLC, Bend, OR (US)

( * ) Notice: Subject to any disclaimer, the term of this patent is extended or adjusted under 35 U.S.C. 154(b) by 289 days.

(21) Appl. No.: 17/453,300

(22) Filed: Nov. 2, 2021

(65) Prior Publication Data
US 2023/0139205 A1 May 4, 2023

(51) Int. Cl.
*H01L 29/06* (2006.01)
*G06F 30/39* (2020.01)
(Continued)

(52) U.S. Cl.
CPC .......... *H01L 29/0696* (2013.01); *G06F 30/39* (2020.01); *H01L 29/0856* (2013.01);
(Continued)

(58) Field of Classification Search
CPC ............. H01L 29/0696; H01L 29/0856; H01L 29/1045; H01L 29/105; H01L 29/42368; H01L 29/42376; H01L 29/4238; H01L 29/66068; H01L 29/7802; H01L 29/1608; H01L 29/0619; H01L 29/41741; H01L 29/66477–6684; H01L 29/78–7926;
(Continued)

(56) References Cited

U.S. PATENT DOCUMENTS

| | | | |
|---|---|---|---|
| 6,503,786 B2 | 1/2003 | Klodzinski | |
| 6,639,242 B1 * | 10/2003 | Chen | H01L 23/38 257/691 |

(Continued)

FOREIGN PATENT DOCUMENTS

| | | |
|---|---|---|
| JP | 2021015884 A | 2/2021 |
| KR | 1020150131195 A | 11/2015 |

(Continued)

OTHER PUBLICATIONS

International Search Report and Written Opinion for related PCT/US2022/078527, mailed Feb. 21, 2023.

*Primary Examiner* — Shahed Ahmed (57) ABSTRACT

A tub of a semiconductor device includes a cool zone with a first projected operating temperature and a hot zone with a second projected operating temperature greater than the first projected operating temperature. A design parameter has a first value in the cool zone and a second value different from the first value in the hot zone. The difference configures the tub to dissipate less heat in the hot zone during operation of the semiconductor device than would be dissipated if the first and second values were equal. The design parameter may be, for example, a tub width, a source structure width, a JFET region width, a channel length, a channel width, a length of a gate, a displacement of a center of the gate relative to a center of a JFET region, a dopant concentration, or a combination thereof.

20 Claims, 8 Drawing Sheets

(51) Int. Cl.
- *H01L 29/08* (2006.01)
- *H01L 29/10* (2006.01)
- *H01L 29/423* (2006.01)
- *H01L 29/66* (2006.01)
- *H01L 29/78* (2006.01)
- *G06F 119/08* (2020.01)
- *H01L 29/16* (2006.01)

(52) U.S. Cl.
CPC ........ *H01L 29/1045* (2013.01); *H01L 29/105* (2013.01); *H01L 29/42368* (2013.01); *H01L 29/42376* (2013.01); *H01L 29/4238* (2013.01); *H01L 29/66068* (2013.01); *H01L 29/7802* (2013.01); *G06F 2119/08* (2020.01); *H01L 29/1608* (2013.01)

(58) Field of Classification Search
CPC ....... H01L 29/1033–1054; G06F 30/39; G06F 2119/08; G01J 5/0007
See application file for complete search history.

(56) References Cited

U.S. PATENT DOCUMENTS

| | | |
|---|---|---|
| 8,436,367 B1 | 5/2013 | Sdrulla et al. |
| 8,674,439 B2 | 3/2014 | Sdrulla et al. |
| 2019/0123186 A1 | 4/2019 | Philippou et al. |
| 2020/0076006 A1* | 3/2020 | Bradwell .............. H01M 10/39 |

FOREIGN PATENT DOCUMENTS

| | | |
|---|---|---|
| WO | 0249116 A2 | 6/2002 |
| WO | 2014149047 A1 | 9/2014 |

* cited by examiner

SEMICONDUCTOR DEVICE WITH IMPROVED TEMPERATURE UNIFORMITY

BACKGROUND

A semiconductor power device may be composed of a plurality of cells. For example, a silicon carbide (SiC) Vertical Metal-Oxide-Semiconductor Field Effect Transistor (VMOSFET) may include a plurality of cells each including its own gate electrode and associated gate pad, source region(s) and associated source pad(s), and drain contact, which in a vertical device such as a VMOSFET may be disposed over a surface of the die opposite the surface over which the gate and source pads are disposed. The cells may be disposed in a semiconductor die in compact active areas (called tubs), each tub being separated from other tubs by inactive areas of the semiconductor die.

A Safe Operating Area (SOA) of such a power device may be limited on the high-current high-voltage side by thermal instability triggered by the negative temperature coefficient of the threshold voltage $V_{th}$ of the cells. Both the bias conditions and the die temperature of the cells play a role in the thermal instability of the cell.

Furthermore, non-uniformity of the turn-on voltage from cell to cell may cause one or several cells to "steal" most if not all the drain current. Due to the negative temperature coefficient of the threshold voltage $V_{th}$, the cells with increased current will have an even lower threshold voltage $V_{th}$ and will start conducting even more current. This produces a local self-heating phenomenon that may result in permanent damage of those cells.

Area on a semiconductor die has been called "the most expensive real estate in the world." Accordingly, economic factors may drive high packing density of cells of a device; i.e., the cells of the device may consume most of the area of the semiconductor die.

However, a high packing density of the cells of a power device may aggravate the conditions that initiate thermal instability. As a result, in some devices, the packing density of the cells may be low, and inactive space between tubs may occupy a substantial portion of the die area.

The need to reduce a peak temperature of the cells of the power semiconductor device may conflict with a goal of packing the cells as densely as possible on the semiconductor die.

SUMMARY OF THE INVENTION

Embodiments relate to semiconductor devices, and in particular to silicon carbide (SiC) power devices having tubs. Embodiments include SiC devices for high-power applications, such as VMOSFETs. Embodiments operate to decrease the maximum operating temperatures within a tub by controlling respective design parameter(s) of portions of the tub according to respective locations of the portions of the tub. The design parameter(s) may include tub width, gate pitch, source structure width, channel length, channel width, gate length, position of a gate relative to a JFET region, dopant concentrations, or combinations thereof.

In an embodiment, a semiconductor device comprises a first tub, The first tub includes a first zone corresponding to a first projected operating temperature, and a second zone corresponding to a second projected operating temperature greater than the first projected operating temperature. A design parameter has a first value in the first zone and a second value different from the first value in the second zone. The first value being different from the second value configures the first tub to have a lower value for a target operating parameter during operation of the semiconductor device than a value the target operating parameter would have in a tub having a base tub design wherein the first value was equal to the second value.

In an embodiment, a method of producing a semiconductor device comprises determining a first base tub design of a first tub; determining a first zone and a second zone of the first tub according to the first base tub design, wherein a first projected operating temperature in the first zone is less than a second projected operating temperature in the second zone, generating a first improved tub design by altering a design parameter in the first zone, the second zone, or both relative to the first base tub design to reduce a target operating parameter, and fabricating the semiconductor device including a tub according to the first improved tub design.

In embodiments, the target operating parameter may be a maximum operating temperature in the second zone, a difference between a maximum operating temperature in the second zone and a maximum operating temperature in the first zone, a difference between a maximum operating temperature in the first tub and a minimum operating temperature in the first tub, or a combination thereof.

DETAILED DESCRIPTION

Embodiments of the present application relate to design parameters of active regions (tubs) containing cells of a semiconductor device, and in particular to design parameters of tubs containing cells of a power device such as a silicon carbide (SiC) Vertical Metal-Oxide-Semiconductor Field Effect Transistor (VMOSFET) or a SiC Vertical Insulated Gate Bipolar Transistor (VIGBT).

Although embodiments presented herein may be described with respect to SiC technology, embodiments are not limited thereto, an in other embodiments, other semiconductor technology, including wide bandgap (WBG) or ultra-wide bandgap (UWGB) technology, may be used instead, such as technologies based on silicon, gallium nitride (GaN), aluminum gallium nitride (AlGaN), high aluminum content AlGaN, beta gallium trioxide ($\beta$-$Ga_2O_3$), diamond, boron nitrides, and the like. For example, embodiments may use GaN instead of SiC. Other embodiments may use a polytype of SiC other than 4H, such as 3C-SiC.

A detailed description of embodiments is provided below along with accompanying figures. The scope of this disclosure is limited only by the claims and encompasses numerous alternatives, modifications and equivalents. Although steps of various processes are presented in a given order, embodiments are not necessarily limited to being performed in the listed order. In some embodiments, certain operations may be performed simultaneously, in an order other than the described order, or not performed at all.

Numerous specific details are set forth in the following description. These details are provided to promote a thorough understanding of the scope of this disclosure by way of specific examples, and embodiments may be practiced according to the claims without some of these specific details. Accordingly, the specific embodiments of this disclosure are illustrative, and are not intended to be exclusive or limiting. For the purpose of clarity, technical material that is known in the technical fields related to this disclosure has not been described in detail so that the disclosure is not unnecessarily obscured. Furthermore, features in drawings may not all be drawn to the same scale, may be exaggerated in one or more dimensions, or both in the interest of clarity.

Embodiments herein are described that include a SiC n-channel vertical MOSFET, but embodiments are not limited thereto. For example, embodiments may instead include a planar MOSFET, a planar or vertical IGBT, a p-channel device, a PIN diode, a planar or vertical Schottky Barrier Diode (SBD), a Bipolar Junction Transistor (BJT), a thyristor, a Gate Turn-Off thyristor (GTO), or combinations thereof.

A power device should be able to dissipate a large amount of power and should therefore have a low thermal resistance so that heat can easily flow out of the device. The device should also provide a high conversion efficiency, and accordingly should have low input, output, and reverse capacitances. These requirements respectively translate to a large die size and a low active area, where the active area is the sum of the areas of the active regions of the device. In commercial MOSFETs of the related art, the die size and active area are closely linked and cannot be tuned independently from each other.

Embodiments may be parts of a semiconductor power device formed of a plurality of cells of the power device in a plurality of separated active regions (tubs) on a semiconductor die. For example, an embodiment may include a SiC n-channel VMOSFET comprised of a plurality of cells in respective tubs, wherein each cell includes a respective SiC n-channel VMOSFET, wherein the tubs are spaced apart; that is, separated by inactive portions of the semiconductor die, where an inactive region may be defined as a region that does not dissipate substantial power, does not perform the function required (designed) for a specific application of the semiconductor device, is not doped above a given threshold (e.g., dopant concentrations of $1.0E17$ $cm^{-3}$ or higher for SiC technology), or the like. In some devices, such as high-voltage power semiconductor devices, the active regions may include and be bounded by high-voltage termination structures that separate them from the inactive portions of the semiconductor die.

Respective control pads (for example, gate pads) may be provided for each active region. In embodiments, one or more pads for a conduction terminal of a first type (for example, one or more source pads) may be provided for each active region. Conduction terminals of a second type (for example, a drain) may be electrically coupled together to a single pad, such as a drain pad. When the device is a vertical device, the pads for the control terminals and the conduction terminals of the first type may be formed over one face (e.g., the top) of the die, and the pad for the conduction terminals of the second type may be formed over an opposite face (e.g. the bottom) of the die.

By spacing apart the tubs, the semiconductor device may produce a more uniform temperature over a surface of the die used to dissipate heat, and may therefore improve the ability of the die to dissipate heat. However, there may still be temperature differences within the tubs.

Because the operating characteristics of a semiconductor device may be limited by the highest temperature at any point on the semiconductor device, temperature differences within a tub may contribute to reduced performance of the semiconductor device. Accordingly, embodiments control respective design parameters of portions of a tub (such as a shape of each portion of the tub, a pitch of devices in each portion of the tub, dimensions of elements of the devices in each portion of the tub, and/or doping concentrations within each portion of the tub) in order to reduce the power dissipation per unit area in portions of the tub projected to have higher temperatures under projected operating conditions.

Figure 1:
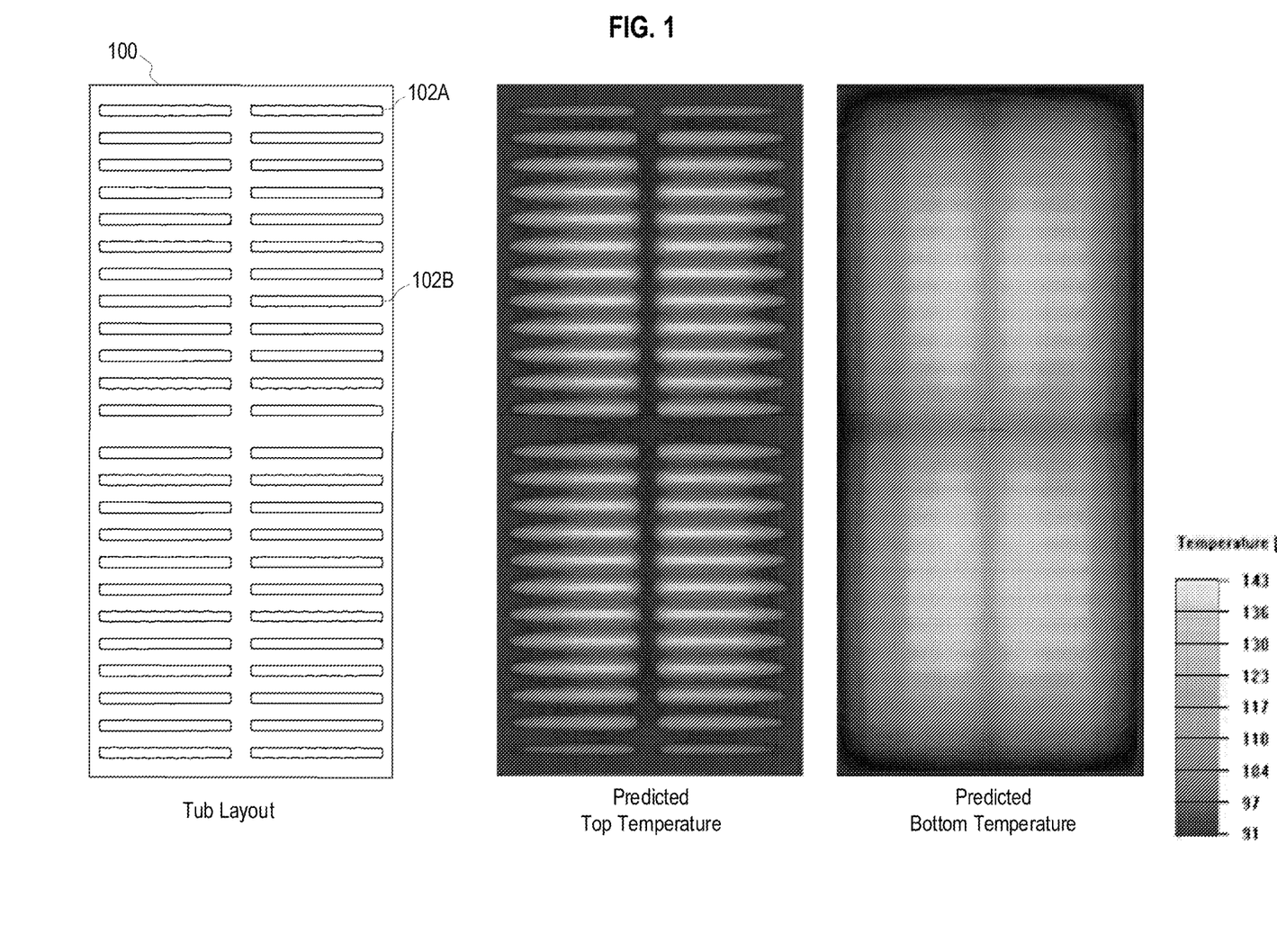
FIG. 1 illustrates a layout of a device including tubs on a semiconductor die and a thermal analysis thereof such as may be used in designing an embodiment.

FIG. 1 illustrates a layout of a device including tubs on a semiconductor die 100 and a thermal analysis thereof such as may be used in designing an embodiment. The layout of the device may be an initial layout that will be adapted in accordance with embodiments based on the thermal analysis.

FIG. 1 shows a semiconductor die 100 (hereinafter, die 100) include a plurality of tubs. The plurality of tubs include first and second tubs 102A and 102B, and may be collectively referred to as tubs 102. The tubs 102 may include cells of one or more semiconductor devices. In an embodiment, a single semiconductor device may have cells disposed in each of the tubs 102, but embodiments are not limited thereto, and in embodiments, a plurality of semiconductor devices may have respective cells disposed in some or all of the tubs 102.

FIG. 1 also shows results of a thermal analysis of the die 100 under operating conditions. The results show projected operating temperatures on both the top surface of the die 100 and on the bottom surface of the die 100. In FIG. 1, lighter areas correspond to relatively high (hotter) temperatures and darker areas correspond to relatively low (cooler) temperatures.

The thermal analysis may be a result produced by computer modelling, may be the result of thermal imaging of an operating semiconductor device that is to be improved by incorporation of embodiments of the present disclosure, or may be a result of other methods of determining temperatures of a semiconductor device under operating conditions. Operating conditions may include both the electrical parameters (such as voltage, current, operating frequency, and load characteristic) of the semiconductor device and the thermal environment (such as ambient temperature, mechanical configuration, and cooling mechanisms) in which the device operates.

As shown in FIG. 1, projected operating temperatures at any point on the die 100 under operating conditions may vary according to a location of a tub 102 and according to a location within the tub 102. For example, FIG. 1 shows top surface temperatures of the tub 102A are substantially lower than top surface temperatures of the tub 102B, and top surface temperatures of a central portion of tub 102B are substantially higher than top surface temperatures of outermost (peripheral) portions of tub 102B. In the illustrative example, maximum operating temperatures in tubs 102A and 102B may be 128° C. and 143° C., respectively, and a difference between minimum and maximum operating temperatures in each of the tubs 102 may be up to 33° C.

As used in this document, an operating temperature refers to a temperature arising when the device is performing the operation it is designed to perform in the operating environment it is designed to operate in. The operating temperature may or may not be the same as minimum or maximum temperature that the device is rated to operate at. For example, a SiC power MOSFET may be rated to operate at junction temperatures of up to 200° C., but in order to ensure a safety margin, optimize system performance, or both may have a projected maximum operating temperature of 150° C. in a target application and environment.

In embodiments, design parameters of portions of one or more of the tubs 102 may be determined in accordance with the projected operating temperatures thereof. For example, one or more design parameters of the tub 102 may be different in cooler portions of the tub 102 than the corresponding design parameters in hotter portions of the tub 102. The design parameters that differ may include an overall dimension (such as a width) of the tub, dimensions of elements of a device disposed in the tub (such as a gate pitch, source width, gate width, channel length, or channel width), doping concentrations (such as a P body doping concentration in a channel region), or combinations thereof.

Figure 2:
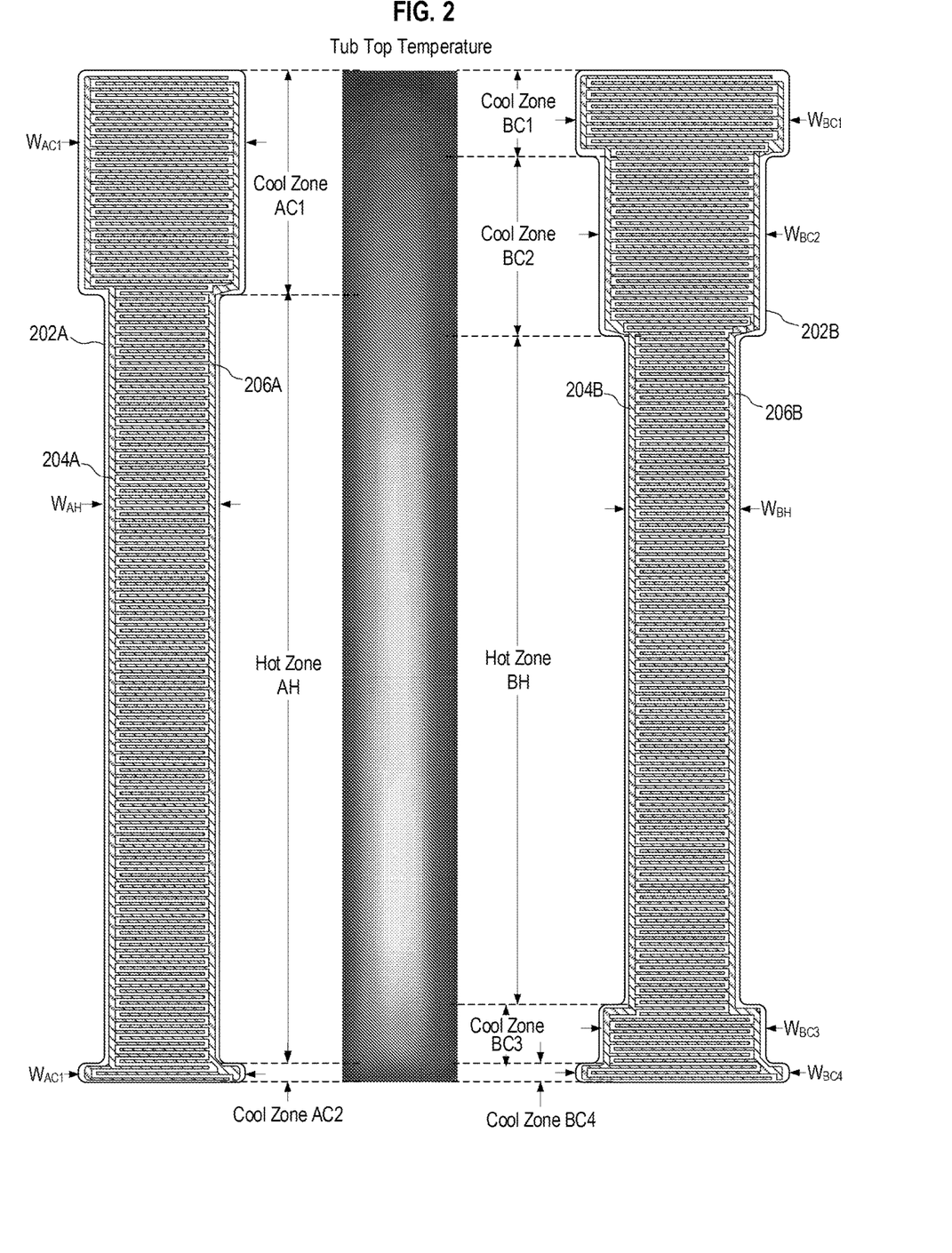
FIG. 2 illustrates a thermal analysis and plan views of tubs corresponding thereto according to embodiments.

FIG. 2 illustrates a thermal analysis of projected top surface temperatures of a base tub design and first and second tubs 202A and 202B having designs corresponding to that analysis according to respective embodiments.

The projected top surface temperatures of the base tub shows higher (lighter) temperatures in central portions of the base tub design and cooler (darker) temperatures in peripheral portions of the base tub design.

In the first illustrative embodiment of FIG. 2, the first tub 202A comprises a vertical device such as a VMOSFET, but embodiments are not limited thereto. The VMOSFET disposed in the first tub 202A has a source electrode 204A and a gate electrode 206A disposed along a top surface of the first tub 202A; a drain electrode of the VMOSFET disposed on a bottom surface of the first tub 202A is not shown. The source electrode 204A and gate electrode 206A may be interdigitated.

In designing the first tub 202A, a hot zone AH and first and second cool zones AC1 and AC2 are identified according to the projected top surface temperatures determined by the thermal analysis. A projected maximum top surface temperature in the hot zone AH is greater than respective projected maximum top surface temperatures in the first and second cool zones AC1 and AC2.

In the first tub 202A, respective cool zone widths $W_{AC1}$ and $W_{AC2}$ of the first and second cool zones AC1 and AC2 have been increased relative to the hot zone width $W_{AH}$ in the hot zone AH. The cool zone widths $W_{AC1}$ and $W_{AC2}$ may have been increased relative to the corresponding width of the base tub design, the hot zone width $W_{AH}$ may have been decreased relative to the corresponding width of the base tub design, or both.

Lengths of the fingers of the interdigitated source electrode 204A and a gate electrode 206A are increased or decreased, relative to the base tub design, in accordance with the widths of the zones that each finger is in.

By increasing the widths of the cool zones, for a given current passing through the device(s) in the first tub 202A, more of the current flows through the cool zones and less of the current flows through the hot zones, relative to the base tub design. This results in less heat being generated in the hot zones, which reduces the temperatures in the hot zones and therefore results in a reduction in a difference between the minimum and maximum operating temperatures of the first tub 202A relative to the base tub design, a reduction in a difference between the maximum operating temperature in the cool zones and maximum operating temperature in the hot zones of the second tub 202B relative to the base tub design, or both.

In the second illustrative embodiment of FIG. 2, the second tub 202B comprises a vertical device such as a VMOSFET, but embodiments are not limited thereto. The VMOSFET disposed in the second tub 202B has a source electrode 204B and a gate electrode 206B disposed along a top surface of the second tub 202B; a drain electrode of the VMOSFET disposed on a bottom surface of the second tub 202B is not shown. The source electrode 204B and gate electrode 206B may be interdigitated.

In designing the second tub 202B, a hot zone BH and first, second, third, and fourth cool zones BC1, BC2, BC3, and BC4 are identified according to the projected top surface temperatures determined by the thermal analysis. A projected maximum top surface temperature in the hot zone BH is greater than respective projected maximum top surface temperatures in the second and third cool zones BC2 and BC3, the projected maximum top surface temperature in the second cool zone BC2 is greater than a projected maximum top surface temperatures in the first cool zone BC1, and the projected maximum top surface temperature in the third cool zone BC3 is greater than a projected maximum top surface temperatures in the fourth cool zone BC4.

In the second tub 202B, respective cool zone widths $W_{BC1}$, $W_{BC2}$, $W_{BC1}$, and $W_{BC4}$ of the first through fourth cool zones BC1 through BC4 are increased relative to the hot zone width $W_{BH}$ of the hot zone BH. The first and fourth cool zone widths $W_{BC1}$ and $W_{BC4}$ may be increased relative to the corresponding width of the base tub design, the second and third cool zone widths $W_{BC2}$ and $W_{BC3}$ may be increased relative to or kept the same as the corresponding width of the base tub design, the hot zone width $W_{BH}$ may be decreased relative to the corresponding width of the base tub design, or combinations thereof.

Lengths of the fingers of the interdigitated source electrode 204B and a gate electrode 206B are increased or decreased, relative to the base tub design, in accordance with the widths of the zones that each finger is in.

By increasing the widths of the cool zones, for a given current passing through the device(s) in the second tub 202B, more of the current flows through the cool zones and less of the current flows through the hot zone, relative to the base tub design. By increasing the widths of the coolest zones (e.g., first and fourth cool zones BC1 and BC4) more than the widths of other cool zones (e.g., second and third cool zones BC1 and BC4), a greater portion of the current flows through the coolest zones. This results in less heat being generated in the hot zones, which reduces temperatures in the hot zones and therefore results in a reduction in a difference between the minimum and maximum operating temperature of the second tub 202B relative to the base tub design, a reduction in a difference between the maximum operating temperature in the cool zones and maximum operating temperature in the hot zones of the second tub 202B relative to the base tub design, or both.

Figure 3:
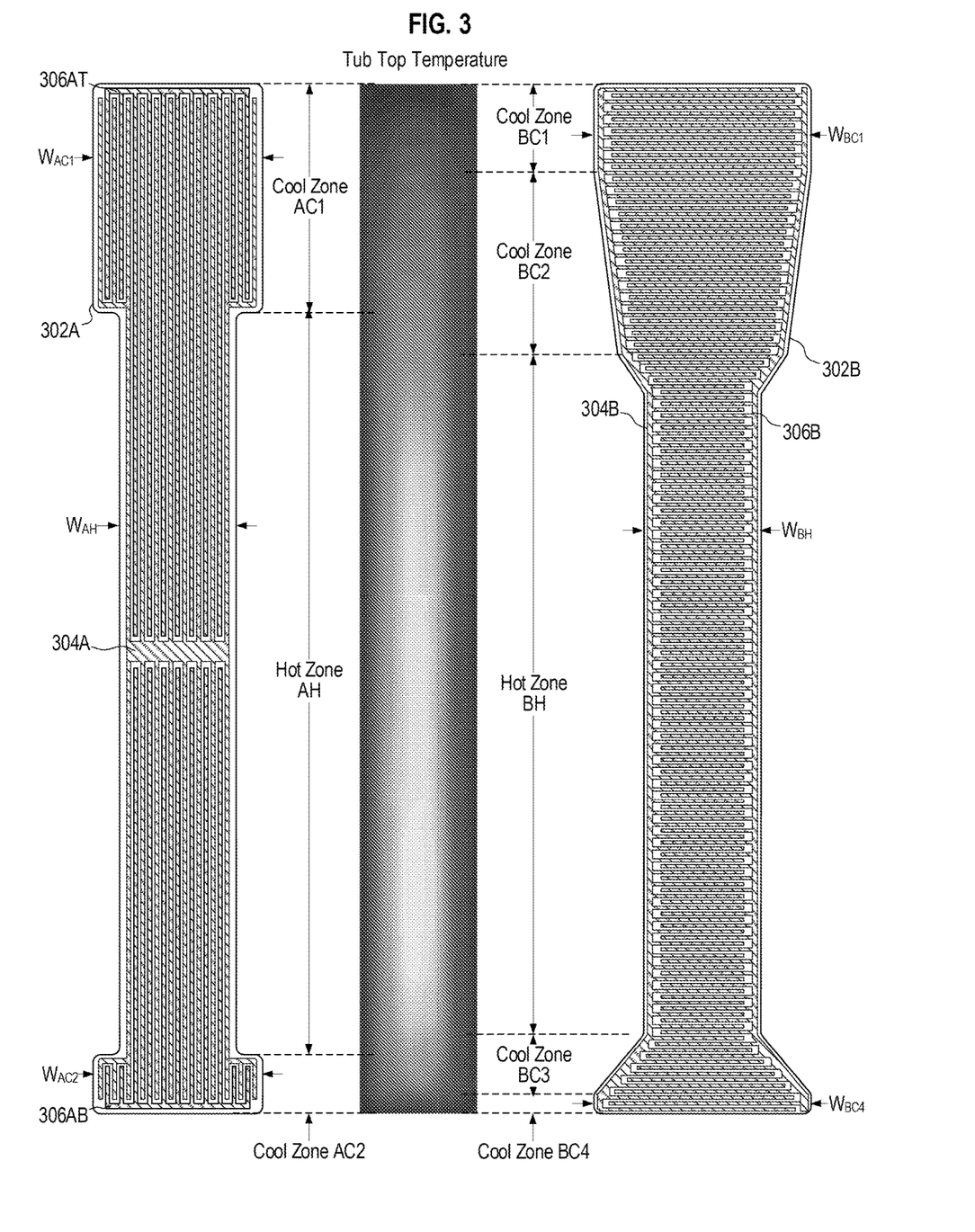
FIG. 3 illustrates a thermal analysis and plan views of tubs corresponding thereto according to further embodiments.

FIG. 3 illustrates a thermal analysis of projected top surface temperatures of a base tub design and first and second tubs 302A and 302B having designs corresponding to that analysis according to respective embodiments.

The projected top surface temperatures is as described with respect to FIG. 2.

The first tub 302A is similar to the first tub 202A of FIG. 2 except that the interdigitated electrodes run along a length of the first tub 302. The first tub 302A accordingly includes a source electrode 304A and top and bottom gate electrodes 306AT and 306AB.

In contrast with the lengths of the fingers of the electrodes varying according to the width of the zones as shown in first tub 202A of FIG. 2, because the interdigitated electrodes run along the length of the first tub 302, the number of fingers in each of the source electrode 304A and top and bottom gate electrodes 306AT and 306AB vary according to the widths of the zone.

The first tub 302A provides the benefits described for the first tub 202A of FIG. 2 for the reasons similar to those provided in the description of the first tub 202A.

The second tub 302B is similar to the second tub 202B of FIG. 2 except that the width of the second cool zone BC2 varies continuously between the hot zone width $W_{BH}$ and the first cool zone width $W_{BC1}$, and the width of the third cool zone BC3 varies continuously between the hot zone width $W_{BH}$ and the fourth cool zone width $W_{BC4}$.

The second tub 302B provides the benefits described for the second tub 202B of FIG. 2 for the reasons similar to those provided in the description of the second tub 202B.

Figure 4A:
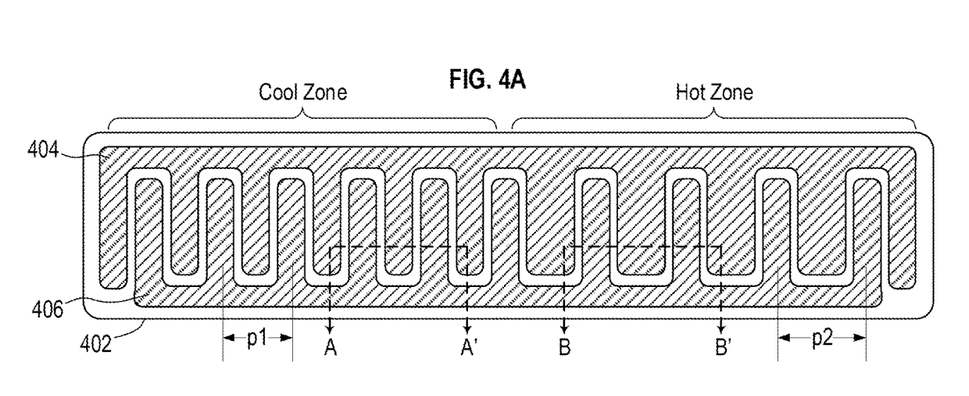
FIG. 4A is a plan view of a tub according to another embodiment.

FIG. 4A illustrates a tub 402 according to another embodiment. The tub 402 includes a device having source electrode 404 interdigitated with a gate electrode 406 and disposed along a top surface of the tub 402; a drain electrode disposed on a bottom surface of the tub 402 is not shown.

In the illustrative embodiment of FIG. 4, the tub 402 comprises a vertical device such as a VMOSFET, but embodiments are not limited thereto.

Using thermal analysis of a base tub design, the tub 402 has been determined to have a cool zone and a hot zone, wherein a maximum projected operating temperature of the hot zone is greater than a maximum projected operating temperature of the cool zone.

A first gate pitch p1 in the cool zone of tub 402 is less than a second gate pitch p2 of the hot zone of tub 402. The gate pitches are varied by varying a width of a source structure width, as shown in FIGS. 4B and 4C and as reflected in the increased width shown for the fingers of the source electrode 404 in the hot zone in FIG. 4A.

Figure 4B:
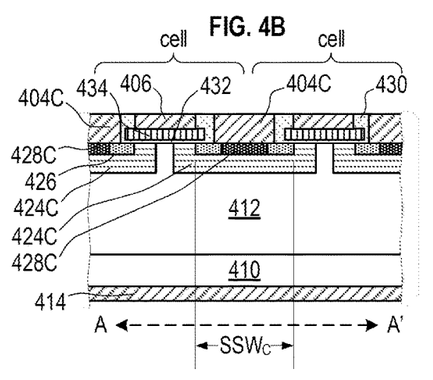
FIG. 4B is a cross sectional view of a portion of a cool zone of the tub of FIG. 4A according to an embodiment.
Figure 4C:
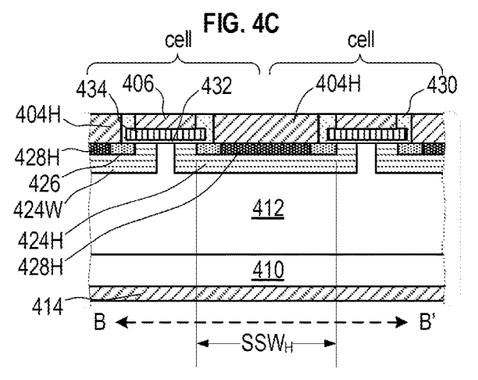
FIG. 4C is a cross sectional view of a portion of a hot zone of the tub of FIG. 4A according to an embodiment.

FIGS. 4B and 4C show in simplified form possible structures of VMOSFET cells in the cool and hot zones, respectively, of the tub 402, but embodiments are not limited thereto.

FIG. 4B illustrates a cross section of a portion of the cool zone of the tub 402 of FIG. 4A taken along the line A-A' and according to an embodiment. The cross section is of a portion of a VMOSFET, but embodiments are not limited thereto. The cross section includes two MOSFET cells of the VMOSFET.

FIG. 4B shows a semiconductor substrate 410 and an epitaxy layer 412 disposed over a top surface the semiconductor substrate 410. In embodiments, the semiconductor substrate 410 and the epitaxy layer 412 comprise 4H-SiC, but embodiments are not limited thereto.

FIG. 4B further shows a drain contact 414 disposed over a bottom surface the semiconductor substrate 410. The drain contact 414 may be electrically connected to all the drains of all the MOSFET cells in the tub 402, and may also be electrically connected to drains of other tubs in the device including the tub 402. A silicide layer (not shown) may be disposed between the drain contact 414 and the semiconductor substrate 410 to improve the electrical connection between them; the silicide layer may comprise, for example, nickel silicide, or may be a silicide of another metal capable of forming an ohmic contact with n-type SiC.

Cool zone p-bodies 424C of p-doped semiconductor are disposed within the epitaxy layer 412. Heavily-doped cool zone p-type regions 428C and heavily-doped n-type source regions 426 are disposed within each of the p-bodies 424C. A cool zone source structure width $SSW_C$ corresponds to a distance from outermost edges of two n-type source regions 426 that are disposed adjacent to a same finger of a cool zone source electrode 404C.

Silicide layers (not shown) may be disposed over and electrically connected to the heavily-doped cool zone p-type regions 428C and the source regions 426; the heavily-doped cool zone p-type regions 428C operate to provide a low contact resistance connection between the silicide layer and the cool zone p-bodies 424C. The silicide layers may comprise nickel silicide, or may be a silicide of another metal capable of forming an ohmic contact with both p-type and n-type SiC.

A dielectric 430 including gate dielectrics 432 is disposed over the epitaxy layer 412 including over portions of the cool zone p-bodies 424C and source regions 426. In an embodiment, the dielectric 430, the gate dielectric 432, or both may comprise silicon dioxide ($SiO_2$). In an embodiment, the dielectric 430 may comprise BoroPhosphoSilcate Glass (BPSG). In an embodiment, the dielectric 430 may comprise a material with low dielectric permittivity ("low-k" material), such as but not limited to BenzoCycloButene (BCB).

Gates 434 are disposed over the gate dielectrics 432 and overlapping portions of the cool zone p-bodies 424C; the portions of the cool zone p-bodies 424C overlapped by a gate 434 comprise a channel region of the MOSFET cell corresponding to that gate 434. The gates 434 may comprise doped polysilicon.

Gate electrodes 406 are disposed over and in electrical contact with the gates 434. Cool zone source electrodes 404C, which are portions of source electrode 404 of FIG. A, are formed over and in electrical contact with the heavily-doped cool zone p-type regions 428C and n-type source regions 426. The gate electrodes 406 and the cool zone source electrodes 404 may each comprise aluminum, among other conductors.

A passivation layer (not shown) may be disposed over the dielectric 430, the gate contacts 406, and the source contacts 404, and in an embodiment may include silicon oxynitride (SiON).

FIG. 4C illustrates a cross section of a portion of the hot zone of the tub 402 of FIG. 4A taken along the line B-B' and according to an embodiment. As in FIG. 4B, the cross section is of a portion of a VMOSFET and includes two MOSFET cells thereof, but embodiments are not limited thereto. Like reference numbers in FIGS. 4B and 4C refer to similar features.

The MOSFET cells shown in FIG. 4C differ from the MOSFET cells shown in FIG. 4B in that hot zone p-bodies 424H are substantially wider than the cool zone p-bodies 424C. Accordingly, the current-carrying regions of the MOSFET cells (such as the channel regions) are spaced farther apart in the hot zone than in the cool zone. Because the current-carrying regions of the cool zone and hot zone cells are substantially the same, the increased spacing of the MOSFET cells in the hot zone, which corresponds to the increased second gate pitch p2 in the hot zone, reduces the amount of current flowing per unit-area of the hot zone and thereby decreases operating temperatures in the hot zone.

The MOSFET cells shown in FIG. 4C also differ from the MOSFET cells shown in FIG. 4B in that the hot zone source electrodes 404H are substantially wider than the cool zone source electrodes 404C, but embodiments are not limited thereto; in other embodiments, the hot zone source electrodes 404H may have the same width as the cool zone source electrodes 404C.

The MOSFET cells shown in FIG. 4C also differ from the MOSFET cells shown in FIG. 4B in that heavily-doped hot zone p-type regions 428H are substantially wider than the heavily-doped cool zone p-type regions 428C, but embodiments are not limited thereto; in other embodiments, the heavily-doped hot zone p-type regions 428H may have the same width as the heavily-doped cool zone p-type regions 428C.

A hot zone source structure width $SSW_H$ corresponds to a distance from outermost edges of two n-type source regions 426 that are disposed adjacent to a same finger of a hot zone source electrode 404H. The hot zone source structure width $SSW_H$ is substantially larger than the cool zone source structure width $SSW_C$ of FIG. 4B.

Figure 5A:
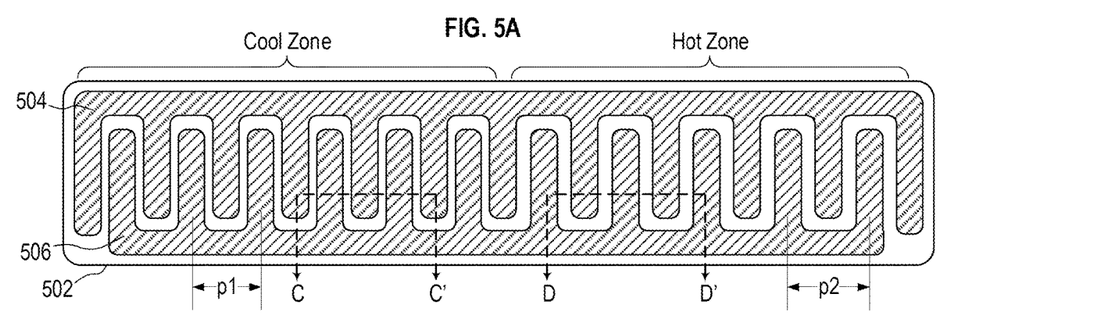
FIG. 5A is a plan view of a tub according to another embodiment.

FIG. 5A illustrates a tub 502 according to another embodiment. The tub 502 includes a device having a source electrode 504 interdigitated with a gate electrode 506 and disposed along a top surface of the tub 502; a drain electrode disposed on a bottom surface of the tub 502 is not shown. The tub 502 may comprise a vertical device such as a VMOSFET, but embodiments are not limited thereto.

Using thermal analysis of a base tub design, the tub 502 has been determined to have a cool zone and a hot zone, wherein a maximum projected operating temperature of the hot zone is greater than a maximum projected operating temperature of the cool zone.

Figure 5B:
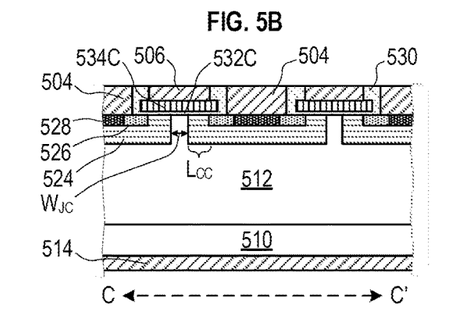
FIG. 5B is a cross sectional view of a portion of a cool zone of the tub of FIG. 5A according to an embodiment.

A first gate pitch p1 in the cool zone of tub 502 is less than a second gate pitch p2 in the hot zone of tub 502. The gate pitches are varied by varying a width of a JFET region, as shown in FIG. 5B and any one of FIGS. 5C through 5F, or by varying a channel length as shown in FIGS. 5B and 5G. The variation in gate pitch is reflected in the increased horizontal separation shown between the fingers of the source electrode 504 and the gate electrode 506 in the hot zone in FIG. 5A.

FIG. 5B illustrates a cross section of a portion of the cool zone of the tub 502 of FIG. 5A taken along the line C-C' and according to an embodiment. As in FIG. 4B, the cross section is of a portion of a VMOSFET and includes two MOSFET cells thereof, but embodiments are not limited thereto. Features having reference numbers 504, 506, 510, 512, 514, 524, 526, 528, and 530 in FIG. 5B respectively correspond to features having reference numbers 404C, 406, 410, 412, 414, 424C, 426C, 428C, and 430 in FIG. 4B, and descriptions thereof are omitted in the interest of brevity.

In the embodiment of FIG. 5B, a cool zone gate 534C is disposed over the cool zone gate dielectric 532C and has a first gate width. A JFET region disposed under the gate electrode and between two p-bodies 524 has a cool zone JFET width $W_{JC}$. Portions of the p-bodies 524 overlapped by the cool zone gate 534C comprise a channel region of the MOSFET cell having a cool zone channel length $L_{CC}$.

FIGS. 5C, 5D, 5E, 5F, and 5G respectively illustrate cross sections of portions of hot zones of the tub 502 of FIG. 5A along the line D-D' according to respective embodiments. As in FIG. 5B, the cross section is of a portion of a VMOSFET and includes two MOSFET cells thereof, but embodiments are not limited thereto. Like reference numbers in FIG. 5B and FIGS. 5C through 5G refer to similar features.

Figure 5C:
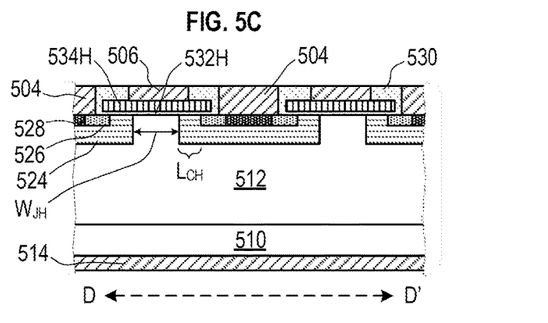
FIGS. 5C, 5D, 5E, 5F, and 5G respectively are respective cross sectional views of portions of hot zones of the tub of FIG. 5A according to embodiments.

In the embodiment of FIG. 5C, the MOSFET cells differ from the MOSFET cells shown in FIG. 5B in that distance between the p-bodies 524 are substantially greater in the hot zone, resulting in a hot zone gate 534H being substantially wider than the cool zone gate 534C, a hot zone gate dielectric 532H being substantially wider than the cool zone gate dielectric 532C, and a hot zone JFET width $W_{JH}$ being substantially greater than the cool zone JFET width $W_{JC}$. As a result, the current-carrying regions (such as the channel regions) of each MOSFET cell are spaced farther apart in the hot zone than in the cool zone.

Because hot zone channel length $L_{CH}$ is substantially the same as the cool zone channel length $L_{CC}$, the electrical characteristics of the current-carrying regions of the cool zone and hot zone cells are substantially the same. Accordingly, the increased spacing of the current-carrying regions in the hot zone, which corresponds to the increased second gate pitch p2 in the hot zone relative to the first gate pitch p1 in the cool zone, reduces the amount of current flowing per unit-area of the hot zone and thereby decreases operating temperatures in the hot zone.

In the embodiments shown in FIGS. 5B through 5F, the channel lengths and gate electrode widths are the same in the hot zone as in the cool zone, but embodiments are not limited thereto.

Figure 5D:
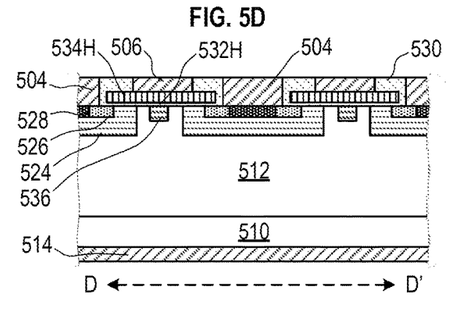

In the embodiment of FIG. 5D, the MOSFET cells differ from the MOSFET cells shown in FIG. 5C in that a p-doped region 536 is disposed near the center of the JFET region beneath the hot zone gate 534H. The p-doped region 536 provides protection against electrical breakdown of the central portion of the hot zone gate dielectric 532H, and may be electrically connected to the source electrode 504 ("grounded") or may be electrically isolated ("floating").

The embodiment of FIG. 5D also provides the benefits described for the embodiment of FIG. 5C for substantially the same reasons as discussed in the description thereof.

Figure 5E:
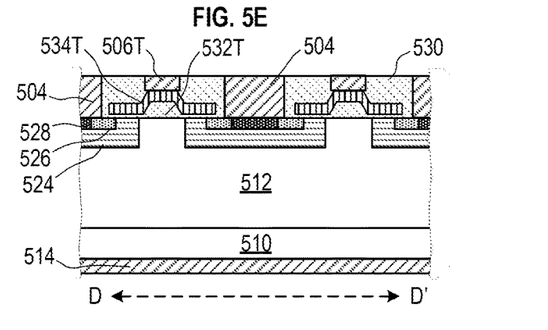

In the embodiment of FIG. 5E, the MOSFET cells differ from the MOSFET cells shown in FIG. 5C in that the hot zone gate 534T and the hot zone gate dielectric 532T of FIG. 5E are terraced in order to provide protection against electrical breakdown of the central portion of the hot zone gate dielectric 532T.

In the embodiment shown in FIG. 5E, the hot zone gate electrode 506T are illustrated as being narrower than the cool zone gate electrode 506, but embodiments are not limited thereto.

The embodiment of FIG. 5E also provides the benefits described for the embodiment of FIG. 5C for substantially the same reasons as discussed in the description thereof.

Figure 5F:
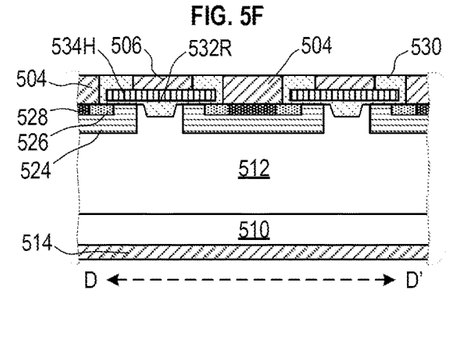
Figure 5G:
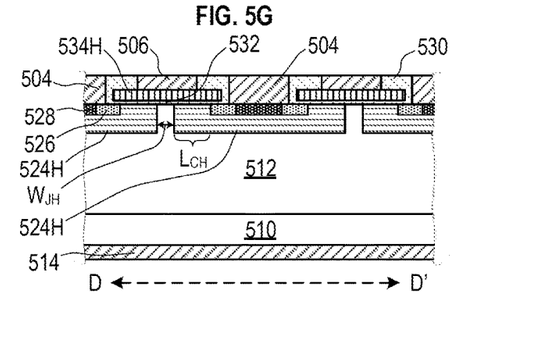

In the embodiment of FIG. 5F, the MOSFET cells differ from the MOSFET cells shown in FIG. 5C in that the hot zone gate dielectric 532R of FIG. 5E is recessed into the JFET region of the epitaxy layer 512 in order to provide protection against electrical breakdown of the central portion of the hot zone gate dielectric 532R.

The embodiment of FIG. 5F provides the benefits described for the embodiment of FIG. 5C for substantially the same reasons as discussed in the description thereof.

In the embodiment of FIG. 5G, the MOSFET cells differ from the MOSFET cells shown in FIG. 5C in that the hot zone p-bodies 524H have an increased width compares to the cool zone p-bodies 524, so that channel regions of the hot zone p-bodies 524H beneath the hot zone gate 534H have a hot zone channel length $L_{CH}$ greater than the cool zone channel length $L_{CC}$ of the cool zone p-bodies 524. Because the hot zone channel length $L_{CH}$ is greater than the cool zone channel length $L_{CC}$, the MOSFET cells in the hot zone have a higher on-state resistance than the MOSFET cells in the cool zone. This increase in the on-state resistance of the MOSFET cells in the hot zone, either alone or in combination with an increased gate pitch in the hot zone as shown in FIG. 5G, reduces the current flowing through the hot zone during operation, which reduces the power dissipated in the hot zone, which reduces operating temperatures in the hot zone.

In the embodiment shown in FIG. 5G, the hot zone p-bodies 524H are lengthened so that the hot zone JFET region width $W_{JH}$ may be substantially the same as the cool zone JFET region width $W_{JC}$, but embodiments are not limited thereto.

Figure 6A:
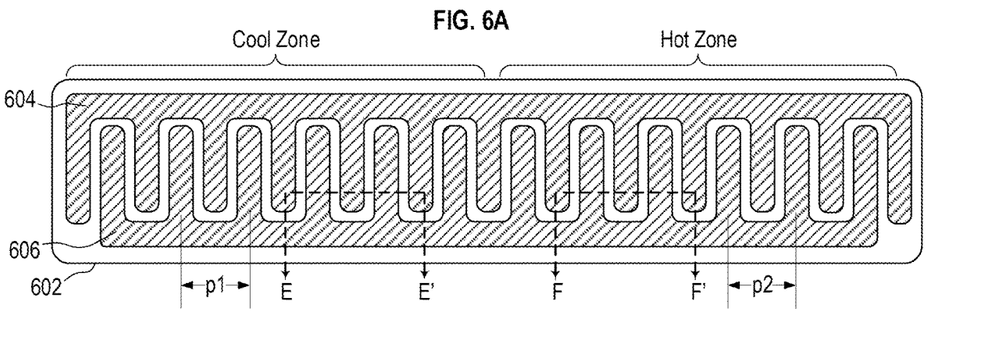
FIG. 6A is a plan view of a tub according to another embodiment.

FIG. 6A illustrates a tub 602 according to another embodiment. The tub 602 includes a device having source electrode 604 interdigitated with a gate electrode 606 and disposed along a top surface of the tub 602; a drain electrode disposed on a bottom surface of the tub 602 is not shown. The tub 602 may comprise a vertical device such as a VMOSFET, but embodiments are not limited thereto.

Using thermal analysis of a base tub design, the tub 602 has been determined to have a cool zone and a hot zone, wherein a maximum projected operating temperature of the hot zone is greater than a maximum projected operating temperature of the cool zone.

A first gate pitch p1 in the cool zone of the tub 602 is substantial the same as a second gate pitch p2 of the hot zone of the tub 602. Accordingly, the design parameters that differ between the hot zone of the tub 602 and the cool zone of the tub 602 are design parameters that do not affect the gate pitch.

Figure 6B:
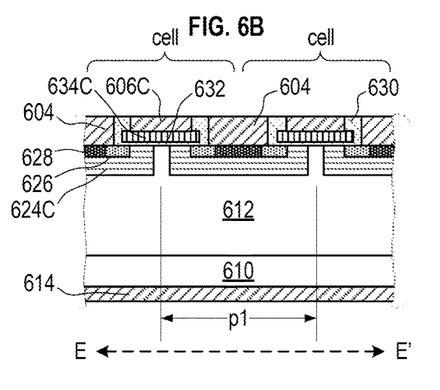
FIG. 6B is a cross sectional view of a portion of a cool zone of the tub of FIG. 6A according to an embodiment.

FIG. 6B illustrates a cross section of a portion of a cool zone of the tub 602 of FIG. 6A taken along the line E-E' and according to an embodiment. As in FIG. 4B, the cross section is of a portion of a VMOSFET and includes two MOSFET cells thereof, but embodiments are not limited thereto. Features having reference numbers 604, 606C, 610, 612, 614, 624C, 626, 628, 630, 632, and 634C in FIG. 6B respectively correspond to features having reference numbers 404C, 406, 410, 412, 414, 424C, 426C, 428C, 430, 432, and 434 in FIG. 4B, and descriptions thereof are omitted in the interest of brevity.

Figure 6C:
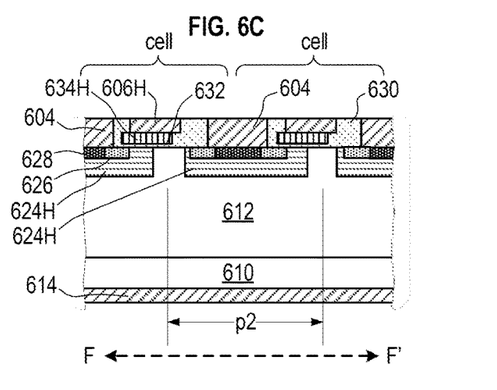
FIG. 6C is a cross sectional view of a portion of a hot zone of the tub of FIG. 6A according to an embodiment.

FIG. 6C illustrates a cross section of a portion of a hot zone of the tub 602 of FIG. 6A taken along the line E-E' and according to the embodiment of FIG. 6B. As in FIG. 6B, the cross section is of a portion of a VMOSFET and includes two MOSFET cells thereof, but embodiments are not limited thereto. Like reference numbers in FIGS. 6A through 6C refer to similar features.

In FIG. 6C, the MOSFET cells differ from the MOSFET cells shown in FIG. 6B in that a hot zone gate 634H is offset so that the hot zone gate 634H has a corresponding channel region (the region of a p-body 624H overlapped by the hot zone gate 634H) in only one of the two hot zone p-bodies 624H of the corresponding MOSFET cell. As a result, the hot zone channel width of MOSFET cells in the hot zone if one-half a cool zone channel width of MOSFET cells in the cool zone. As a result, the on-state resistance of MOSFET cells in the hot zone is substantially greater than an on-state resistance of MOSFET cells in the cool zone.

This increase in the on-state resistance of the MOSFET cells in the hot zone relative to the cool zone reduces the current flowing through the hot zone during operation, which reduces the power dissipated in the hot zone, which reduces operating temperatures in the hot zone.

Figure 7A:
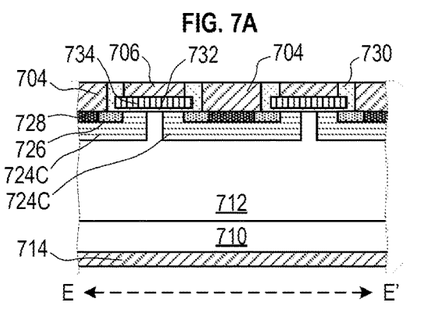
FIG. 7A is a cross sectional view of a portion of a cool zone of the tub of FIG. 6A according to an embodiment.

FIG. 7A illustrates a cross section of a portion of the cool zone of the tub 602 of FIG. 6A taken along the line E-E' and according to another embodiment. As in FIG. 4B, the cross section is of a portion of a VMOSFET and includes two MOSFET cells thereof, but embodiments are not limited thereto. Features having reference numbers 704, 706, 710, 712, 714, 726, 728, 730, 732, and 734 in FIG. 7A respectively correspond to features having reference numbers 404C, 406, 410, 412, 414, 426C, 428C, 430, 432, and 434 in FIG. 4B, and descriptions thereof are omitted in the interest of brevity.

Figure 7B:
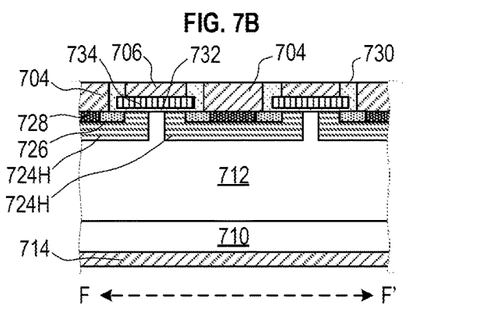
FIG. 7B is a cross sectional view of a portion of a hot zone of the tub of FIG. 6A according to an embodiment.

FIG. 7B illustrates a cross section of a portion of the hot zone of the tub of FIG. 6A taken along the line F-F' and according to the embodiment of FIG. 7A. As in FIG. 7A, the cross section is of a portion of a VMOSFET and includes two MOSFET cells thereof, but embodiments are not limited thereto. Like reference characters in FIGS. 7A and 7B refer to like features.

FIG. 7A differs from FIG. 7B in that hot zone p-bodies 724H of FIG. 7B have higher dopant concentrations than the cool zone p-bodies 724C of FIG. 7A. As a result, the MOSFET cells in the hot zone have a higher on threshold voltage and therefore may have a higher on-state resistance than the MOSFET cells in the cool zone.

This increase in the on-state resistance of the MOSFET cells in the hot zone relative to the cool zone reduces the current flowing through the hot zone during operation, which reduces the power dissipated in the hot zone, which reduces operating temperatures in the hot zone.

In embodiments, the difference in dopant concentrations between the cool zone p-bodies 724C and the hot zone p-bodies 724H may be produced by lowering the dopant concentrations in the cool zone p-bodies 724C relative to the base tub design, increasing the dopant concentrations in the hot zone p-bodies 724H relative to the base tub design, or a combination thereof.

Figure 8:
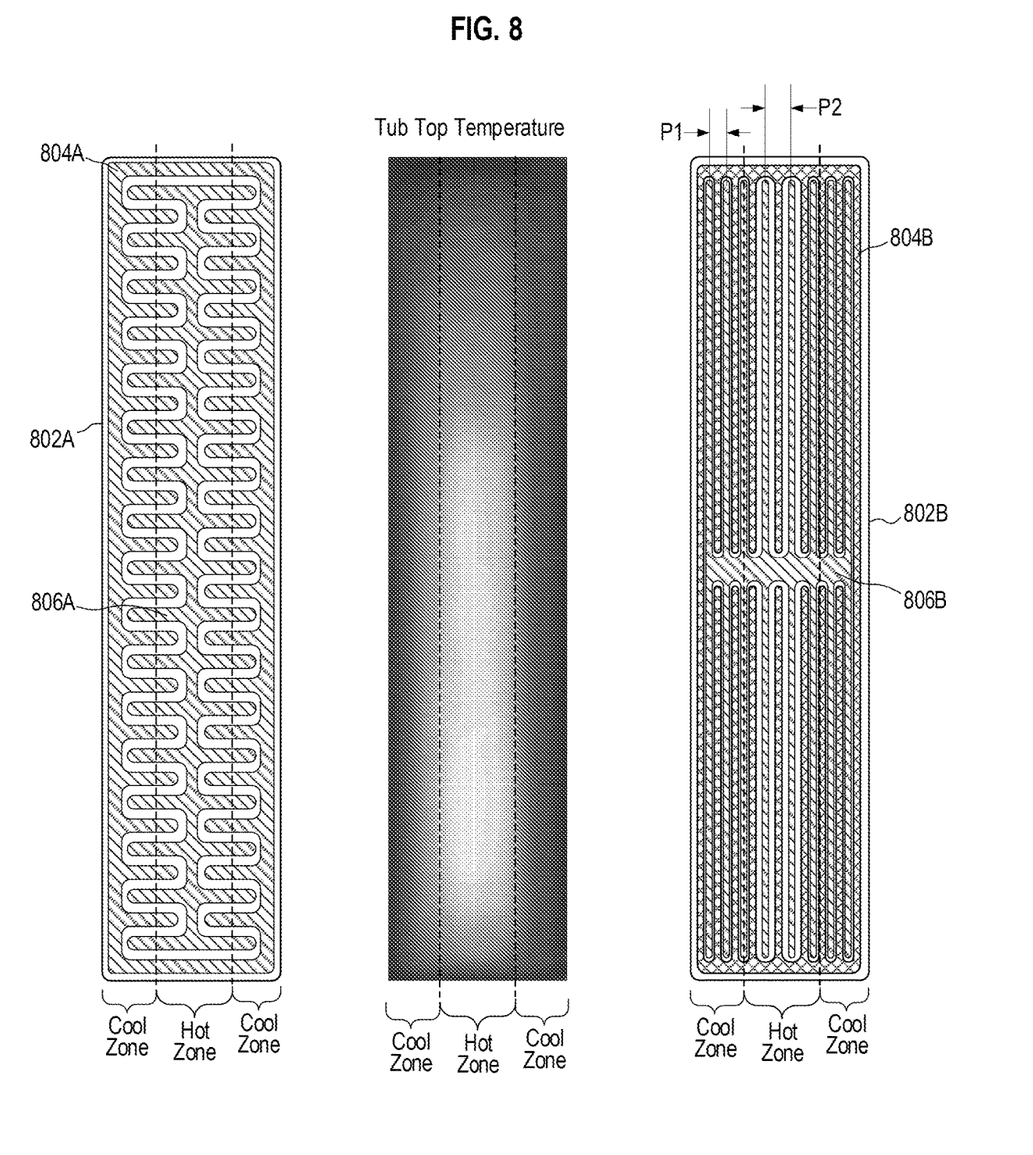
FIG. 8 illustrates a thermal analysis and plan views of tubs corresponding thereto according to further embodiments.

FIG. 8 illustrates a thermal analysis of projected top surface temperatures of a base tub design and first and second tubs 802A and 802B corresponding thereto according to further embodiments. In the embodiments of FIG. 8, the hot zone and the cool zones run along the long axis of the tubs.

The first tub 802A includes a source electrode 804A and a gate electrode 806A. The source electrode 804A and gate electrode 806A are interdigitated and each include a plurality of fingers oriented orthogonally to the length of the first tub 802A, but embodiments are not limited thereto. The first tub 802A may comprise a vertical device such as a VMOSFET, but embodiments are not limited thereto.

In the first tub 802A, a gate pitch does not vary between the hot zone and the cool zone. Accordingly, in the first tub 802A, design parameters that do not affect the gate pitch in the hot zone, the cool zones, or both may be altered, relative to the base tub design, to reduce the projected operating temperatures in the hot zone. For example, the gate design such as described in the embodiment of FIGS. 6A-6C, the use of different dopant concentrations such as described in the embodiment of FIG. 6A and FIGS. 7A and 7B, or both may be used to reduce the projected operating temperatures in the hot zone relative to the base tub design.

The second tub 802B includes a source electrode 804B and a gate electrode 806B. The source electrode 804B and gate electrode 806B are interdigitated and each includes a plurality of fingers oriented parallel to the length of the second tub 802B, but embodiments are not limited thereto. The second tub 802B may comprise a vertical device such as a VMOSFET, but embodiments are not limited thereto.

In the second tub 802B, a second gate pitch P2 between cells in a hot zone is greater than a first gate pitch P1 between cells in a cool zone. Accordingly, in the second tub 802A, design parameters that affect the second gate pitch P2 in the hot zone, the first gate pitch P1 in the cool zone, or both may be altered, relative to the base tub design, to reduce the projected operating temperatures in the hot zone. For example, the altered source regions illustrated in FIGS. 4A through 4C, the altered JFET region width illustrated in FIGS. 5A and 5B, and any one of FIGS. 5C through 5F, the altered channel lengths described with respect to FIGS. 5A, 5B, and 5G, the gate architecture that reduces a channel width illustrated in FIGS. 6A through 6C, the altered dopant concentration illustrated in FIGS. 6A, 7A, and 7B, or combinations thereof may be used to reduce the projected operating temperatures in the hot zone relative to the base tub design.

Figure 9:
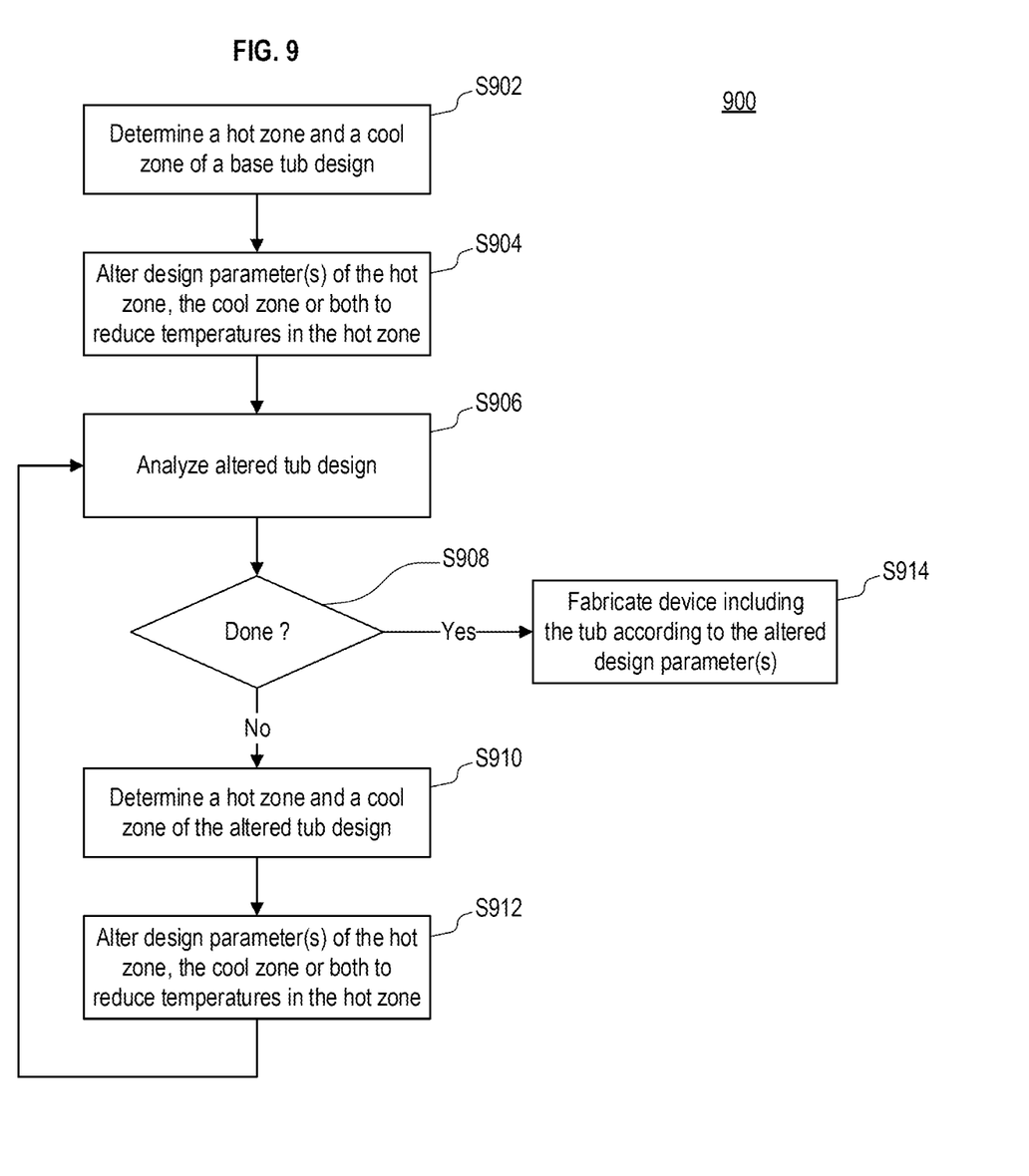
FIG. 9 is a flow chart of a process for fabricating a semiconductor device including a tub according to an embodiment.

FIG. 9 illustrates a process 900 for producing a semiconductor device including a tub according to an embodiment.

At S902, one or more hot zones and one or more cool zones of a base tub design are determined, wherein respective projected operating temperatures of the hot zones are higher than respective projected operating temperatures of the cool zones.

In an embodiment, the hot zones and cool zones may be determined by measuring operating temperatures of a fabricated semiconductor device having a tub with a design similar to the base tub design. In another embodiment, the hot zones and cool zones may be determined by performing computer simulation of a semiconductor device having a tub according to the base tub design, or by other processes known in the related arts.

The determination of the one or more hot zones and the one or more cool zones may be made according to projected electrical, mechanical, and/or thermal operating conditions of the semiconductor device. The determination of the one or more hot zones and the one or more cool zones may be made in consideration of the location of the tub and the locations of one or more other tubs on the semiconductor device.

At S904, an improved tub design is produced by adjusting one or more design parameters of the hot zones, the cool zones, or both to reduce power dissipation in the hot zones relative to the power dissipation of the hot zones in the base tub design. The one or more design parameters may include tub width, gate pitch, p-body width, gate width, JFET region width, channel length, channel width, dopant concentration, or combinations thereof, but embodiments are not limited thereto.

In a version of the process 900 according to an embodiment not shown in FIG. 9, wherein only a single design parameter adjustment step is performed, the process 900 proceeds from S904 to S914.

In FIG. 9, the process 900 proceeds from S904 to S906.

At S906, the process 900 analyzes the improved tub design to determine projected operating temperatures thereof. The analysis may include performing computer simulation of a semiconductor device having a tub according to the improved tub design.

At S908, the process 900 determines, using the results of the analysis performed at S906, whether additional alterations of design parameters of the improved tub design should be considered. The process 900 may determine whether to consider additional alterations of design parameters according to whether a projected peak operating temperature or a reduction of a projected operating temperature spread of the improved tub design meets a predetermined criteria, whether a number of iterations of altering the design parameters has exceed a predetermined limit, or a combination thereof. When the process 900 determines that additional alterations of design parameters of the improved tub design should be considered, at S908 the process 900 proceeds to S910; otherwise the process 900 proceeds to S914.

At S910, one or more hot zones and one or more cool zones of the improved tub design are determined, wherein respective operating temperatures of the hot zones are higher than respective operating temperatures of the cool zones. In an embodiment, the hot zones and cool zones may be determined by performing computer simulation of a semiconductor device having a tub according to the improved tub design, or by other processes known in the related arts.

At S912, the improved tub design is refined by adjusting one or more design parameters of the hot zones, the cool zones, or both to reduce power dissipation in the hot zones relative to the power dissipation of the hot zones in the unrefined improved tub design. The one or more design parameters may include tub width, gate pitch, p-body width, gate width, JFET region width, channel length, channel width, dopant concentration, or combinations thereof. The process 900 then proceeds back to S906.

At S914, a semiconductor device is fabricated. The semiconductor device includes at least one tub fabricated according to the improved tub design. Steps S902 through S912 of the process 900 may be separately performed a plurality of times to produce respective improved tub designs for a plurality of tubs fabricated in the semiconductor device.

Illustrative embodiments have been provided wherein a tub includes a first zone corresponding to a first projected operating temperature and a second zone corresponding to a second projected operating temperature greater than the first projected operating temperature. At least one design parameter has a first value in the first zone and a second value different from the first value in the second zone. The first value being different from the second value configures the tub to have a lower target operating parameter during operation than it would have if the first and second values were equal. The target operating parameter may be a maximum operating temperature in the second zone, a difference between a maximum operating temperature in the second zone and a maximum operating temperature in the first zone, a difference between a maximum operating temperature in the tub and a minimum operating temperature in the tub, or a combination thereof. The at least one design parameter may be a tub width, a gate pitch, a source structure width, a JFET region width, a channel length, a channel width, a dopant concentration, or combinations thereof.

The technologies shown in the illustrated embodiments may be combined. For example, in a combined embodiment, a tub width, a gate pitch, a channel length, and a dopant concentration may all differ in a hot zone relative to a cool zone of a tub in order to reduce an operating temperature of the hot zone, reduce a difference between a temperature of the hot zone and a temperature of the cool zone, reduce a difference between a maximum operating temperature in the tub and a minimum operating temperature in the tub, or combinations thereof.

Aspects of the present disclosure have been described in conjunction with the specific embodiments that are presented as illustrative examples. Numerous alternatives, modifications, and variations to the disclosed embodiments may be made without departing from the scope of the claims set forth below. Embodiments disclosed herein are not intended to be limiting.

What is claimed is:

1. A semiconductor device comprising:
    a first tub corresponding to a first region of a semiconductor die and including:
        a first zone corresponding to a first projected operating temperature, and
        a second zone corresponding to a second projected operating temperature greater than the first projected operating temperature,
    wherein a first design parameter has a first value in the first zone and a second value different from the first value in the second zone,
    wherein the first value being different from the second value configures the first tub to have a lower value for a first target operating parameter during operation of the semiconductor device than a value the first target operating parameter would have in a tub having a base tub design wherein the first value was equal to the second value, and
    wherein the first target operating parameter is a maximum operating temperature in the second zone, a difference between a maximum operating temperature in the second zone and a maximum operating temperature in the first zone, a difference between a maximum operating temperature in the first tub and a minimum operating temperature in the first tub, or a combination thereof.

2. The semiconductor device of claim 1, wherein the first tub further includes:
    a third zone corresponding to a third projected operating temperature less than the second projected operating temperature,
    wherein the first design parameter has a third value in the third zone, and
    wherein a difference between the third value and the second value configures the tub to have a lower value for the target operating parameter during operation of the semiconductor device than a value the target operating parameter would have in a tub having a base tub design wherein the third value was equal to the second value.

3. The semiconductor device of claim 1, comprising:
    a second tub corresponding to a second region of the semiconductor die and including:
        a third zone corresponding to a third projected operating temperature, and
        a fourth zone corresponding to a fourth projected operating temperature greater than the third projected operating temperature,
    wherein a second design parameter has a third value in the third zone and a fourth value different from the third value in the fourth zone,
    wherein the third value being different from the fourth value configures the tub to have a lower value for a second target operating parameter during operation of the semiconductor device than a value the second target operating parameter would have in a tub having a base tub design wherein the third value was equal to the fourth value, and
    wherein the second target operating parameter is a maximum operating temperature in the fourth zone, a difference between a maximum operating temperature in the fourth zone and a maximum operating temperature in the third zone, a difference between a maximum operating temperature in the second tub and a minimum operating temperature in the second tub, or a combination thereof.

4. The semiconductor device of claim 3, wherein the second design parameter is different from the first design parameter, the third value is different from the first value, the fourth value is different from the second value, or combinations thereof.

5. The semiconductor device of claim 1, wherein the first design parameter is a tub width.

6. The semiconductor device of claim 1, wherein the first design parameter is a source structure width.

7. The semiconductor device of claim 1, wherein the first design parameter is a JFET region width.

8. The semiconductor device of claim 1, wherein the first design parameter is a channel length.

9. The semiconductor device of claim 1, wherein the first design parameter is a channel width.

10. The semiconductor device of claim 1, wherein the first design parameter is a length of a gate, a displacement of a center of the gate relative to a center of a JFET region, or both.

11. The semiconductor device of claim 1, wherein the first design parameter is a dopant concentration.

12. A method of producing a semiconductor device, comprising:
    determining a first base tub design of a first tub, the first tub corresponding to a first region of a semiconductor die;
    determining a first zone and a second zone of the first tub according to the first base tub design, wherein a first projected operating temperature in the first zone is less than a second projected operating temperature in the second zone;
    generating a first improved tub design by altering a first design parameter in the first zone, the second zone, or both relative to the first base tub design to reduce a first target operating parameter, wherein the first target operating parameter is a maximum operating temperature in the second zone, a difference between a maximum operating temperature in the second zone and a maximum operating temperature in the first zone, a difference between a maximum operating temperature in the first tub and a minimum operating temperature in the first tub, or a combination thereof; and
    fabricating the semiconductor device including a tub according to the first improved tub design.

13. The method of claim 12, comprising:
    determining a second base tub design of a second tub, the second tub corresponding to a second region of the semiconductor die;
    determining a third zone and a fourth zone of the second tub according to the second base tub design, wherein a third projected operating temperature in the third zone is less than a fourth projected operating temperature in the fourth zone;

generating a second improved tub design by altering a second design parameter in the third zone, the fourth zone, or both relative to the second base tub design to reduce a second target operating parameter, wherein the second target operating parameter is a maximum operating temperature in the fourth zone, a difference between a maximum operating temperature in the fourth zone and a maximum operating temperature in the third zone, a difference between a maximum operating temperature in the second tub and a minimum operating temperature in the second tub, or a combination thereof; and fabricating the semiconductor device including a tub according to the second improved tub design.

14. The method of claim 13, wherein the second design parameter is different from the first design parameter, the third value is different from the first value, the fourth value is different from the second value, or combinations thereof.

15. The method of claim 12, wherein fabricating the semiconductor device including a tub according to the first improved tub design comprises:

determining a third zone and a fourth zone of the first tub according to the first improved tub design, wherein a third projected operating temperature in the third zone is less than a fourth projected operating temperature in the fourth zone;

generating a second improved tub design by altering a second design parameter in the third zone, the fourth zone, or both relative to the first improved tub design to reduce the first target operating parameter; and fabricating the semiconductor device including the tub according to the second improved tub design.

16. The method of claim 12, wherein the first design parameter is a tub width.

17. The method of claim 12, wherein the first design parameter is a source structure width.

18. The method of claim 12, wherein the first design parameter is a JFET region width.

19. The method of claim 12, wherein the first design parameter is a channel length.

20. The method of claim 12, wherein the first design parameter is a channel width, a length of a gate, a displacement of a center of the gate relative to a center of a JFET region, a dopant concentration, or a combination thereof.

* * * * *